(12) United States Patent
Ding et al.

(10) Patent No.: US 9,644,976 B2
(45) Date of Patent: May 9, 2017

(54) BUILDING MISSING MOVEMENT PATH OF AN OBJECT

(71) Applicant: International Business Machines Corporation, Armonk, NY (US)

(72) Inventors: Jian Dong Ding, Shanghai (CN); Yu Wang, Beijing (CN); Jun Chi Yan, Shanghai (CN); Chao Zhang, Beijing (CN); Ya Nan Zhang, Shanghai (CN); Qian Kun Zhao, Shanghai (CN)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 14/693,008

(22) Filed: Apr. 22, 2015

(65) Prior Publication Data

US 2015/0308843 A1   Oct. 29, 2015

(30) Foreign Application Priority Data

Apr. 29, 2014   (CN) .......................... 2014 1 0177783

(51) Int. Cl.
  *G01C 21/30*   (2006.01)
  *G08G 1/01*   (2006.01)

(52) U.S. Cl.
  CPC ........... *G01C 21/30* (2013.01); *G08G 1/0112* (2013.01)

(58) Field of Classification Search
  CPC ... G01C 21/3415; G01C 21/30; G08G 1/0112
  USPC ........................................................ 701/411
  See application file for complete search history.

(56) References Cited

U.S. PATENT DOCUMENTS

| 8,527,196 | B2 | 9/2013 | Alasry et al. |
| 2011/0106833 | A1 | 5/2011 | Albers et al. |
| 2011/0208429 | A1 | 8/2011 | Zheng et al. |

FOREIGN PATENT DOCUMENTS

| CN | 101964148 B | 6/2013 |
| KR | 1020110135084 A | 12/2011 |

OTHER PUBLICATIONS

Akasapu et al., "Efficient Trajectory Pattern Mining for both Sparse and Dense Dataset", International Journal of Computer Applications (0975-8887), vol. 9—No. 5, Nov. 2010, pp. 45-48.
Ding et al., "Building a Missing Part of Atarget Movement Trajectory of an Object", China patent application 201410177783.0, (English Translation), pp. 1-28, filed Apr. 29, 2014.
Kumar et al., "Integrating On-board Diagnostics Speed Data with Sparse GPS Measurements for Vehicle Trajectory Estimation", SICE Annual Conference 2013, Sep. 14-17, 2013, Nagoya University, Nagoya, Japan, pp. 2302-2308.

(Continued)

*Primary Examiner* — Behrang Badii
*Assistant Examiner* — Daniel L Greene
(74) *Attorney, Agent, or Firm* — Edward J. Wixted, III

(57) ABSTRACT

The present disclosure discloses a method and an apparatus for building a missing part of a movement path of an object. One or more frequent points is determined, wherein each of the one or more frequent points is a point on a historical movement path having a number of occurrences greater than a first threshold. A credibility of one or more path segments in determined. A first path segment of the one or more path segments is selected, wherein the credibility of the first path segment is greater than a second threshold. A missing part of a movement path of an object is built using the first path segment.

20 Claims, 8 Drawing Sheets

(56) References Cited

OTHER PUBLICATIONS

Li et al., "Large-Scale Joint Map Matching of GPS Traces", SIGSPATIAL'13, Nov. 5-8, 2013, Orlando, FL, USA, Copyright 2013 ACM, 978-1-4503-2521-Sep. 13, 2011, pp. 1-10.
Mo et al., "Adaptive Sparse Representations for Video Anomaly Detection", IEEE Transactions on Circuits and Systems for Video Technology, vol. 24, No. 4, Apr. 2014, ©2013 IEEE, pp. 631-645.
Wei et al., "Constructing Popular Routes from Uncertain Trajectories", KDD'12, Aug. 12-16, 2012, Beijing, China, Copyright 2012 ACM, 1-58113-000-0/00/0010, pp. 1-9.
Zheng et al., "Reducing Uncertainty of Low-Sampling-Rate Trajectories", Inproceedings, ICDE 2012, International Conference on Data Engineering, Apr. 2012, pp. 1-12.

BUILDING MISSING MOVEMENT PATH OF AN OBJECT

BACKGROUND OF THE INVENTION

The present disclosure relates generally to movement path data processing, and more specifically, to building a missing part of a movement path of an object.

In fields of Intelligent Transportation Systems (ITS) and Connected Vehicles, through analysis of a movement path of an object (e.g., a person or a vehicle, etc.), it is possible to determine a movement status of the object, detect whether the movement path of the object is abnormal, and extract a point of interest (POI) or region of interest (ROI) of the object. Therefore, it is important to obtain an accurate and complete movement path. Currently, the movement path of an object can be obtained by a variety of methods, such as a Global Positioning System (GPS) positioning method and a check-in method. In the GPS positioning method, locations of the object are determined via GPS positioning during movement of the object, thereby determining the movement path of the object. In the check-in method, sensors, cameras or the like are installed in various sites in advance. When the object passes through these sites, the events (i.e., the "check-in") are recorded through the sensors or the cameras, thereby determining the locations of the object. Finally, all the sites which the object passes through may be connected with straight lines to determine the movement path of the object.

The movement path of the object obtained by the methods described above is often discrete and incomplete. For example, in the GPS positioning method, when the object moves to a certain region where a reception quality of a GPS signal is poor or the GPS signal cannot be received, location data of the object in the region may be lost, such that a part of the finally obtained movement path of the object is missing. In the check-in method, since sensors or cameras may only be installed at discrete sites, and the location data of the object obtained by these sensors or cameras are also discrete, the obtained movement path of the object consists of straight lines connecting the respective sites (i.e., is discontinuous and has missing parts). As a result, it is impossible to obtain an accurate result when various analyses and detections are conducted based on such a movement path.

SUMMARY

According to embodiments of the present disclosure, a method for finding a movement path is provided. The method includes determining, by one or more processors, one or more frequent points, wherein each of the one or more frequent points is a point on a historical movement path having a number of occurrences greater than a first threshold; determining, by one or more processors, a credibility of one or more path segments; selecting, by one or more processors, a first path segment of the one or more path segments, wherein the credibility of the first path segment is greater than a second threshold; and building, by one or more processors, a missing part of a movement path of an object using the first path segment.

According to embodiments of the present disclosure, a computer program product for finding a movement path is provided. The computer program product includes a computer readable storage medium and program instructions stored on the computer readable storage medium, the program instructions comprising: program instructions to determine one or more frequent points, wherein the one or more frequent points are a point on a historical movement path having a greater number of occurrences than a first threshold; program instructions to determine a credibility of one or more path segments; program instructions to select a first path segment of the one or more path segments, wherein the credibility of the one or more path segments is greater than a second threshold; and program instructions to build a missing part of a movement path using the first path segment.

According to embodiments of the present disclosure, a computer system for finding a movement path is provided. The computer system includes one or more computer processors; one or more computer readable storage media; program instructions stored on the computer readable storage media for execution by at least one of the one or more processors, the program instructions comprising: program instructions to determine one or more frequent points, wherein the one or more frequent points are a point on a historical movement path having a greater number of occurrences than a first threshold; program instructions to determine a credibility of one or more path segments; program instructions to select a first path segment of the one or more path segments, wherein the credibility of the first path segment is greater than a second threshold; and program instructions to build a missing part of a movement path using the first path segment.

DETAILED DESCRIPTION

Embodiments of the present invention provide a method and an apparatus for building a missing part of a movement path of an object (which may be referred to as a movement path for convenience of description), which can build the missing part of the movement path relatively accurately, so as to provide a good basis for various subsequent analyses and detections based on the movement path.

With the method and the apparatus described herein, a path segment with a high possibility of being the same as the missing part of the movement path of the object can be extracted from the historical movement path of the object, then the missing part of the movement path can be built by using the extracted path segment. Such building method and apparatus do not rely on a map and a road network of a region where the object is located, and have relatively high accuracy.

Some embodiments will be described in more detail with reference to the accompanying drawings, in which the embodiments of the present disclosure have been illustrated. However, the present disclosure may be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

Figure 1:
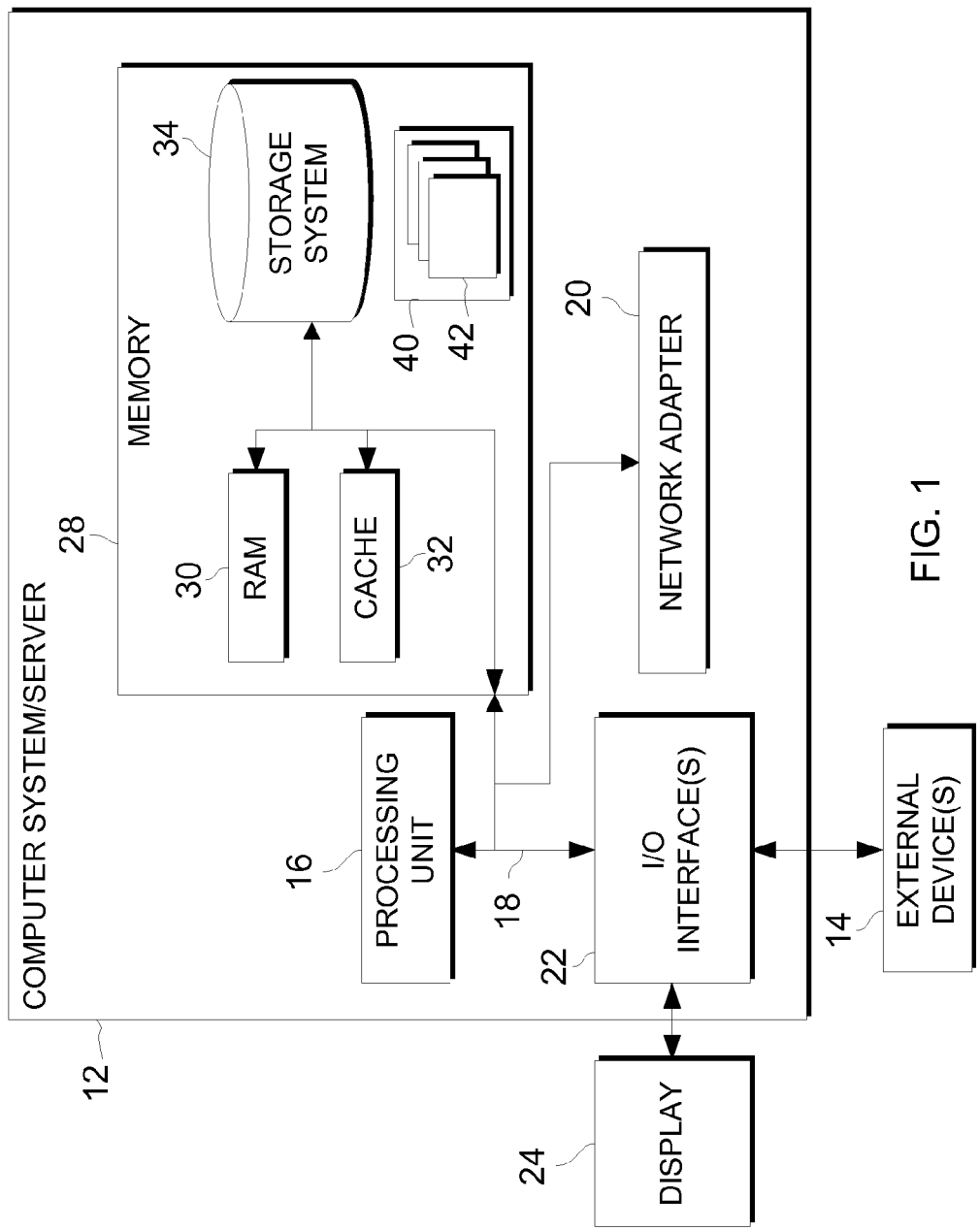
FIG. 1 is a block diagram of an exemplary computer system/server, in accordance with an embodiment of the present disclosure.

Referring now to FIG. 1, in which an exemplary computer system/server, which is applicable to implement the embodiments of the present disclosure, is shown. Computer system/server 12 is only illustrative and is not intended to suggest any limitation as to the scope of use or functionality of embodiments of the invention described herein.

As shown in FIG. 1, computer system/server 12 is shown in the form of a general-purpose computing device. The components of computer system/server 12 may include, but are not limited to, one or more processors or processing unit(s) 16, a system memory 28, and a bus 18 that couples various system components including system memory 28 to processing unit(s) 16.

Bus 18 represents one or more bus structures, including, but not limited to, a memory bus or memory controller, a peripheral bus, an accelerated graphics port, and a processor or local bus using any of a variety of bus architectures. By way of example, without limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 may include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 may be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media may be provided. In such instances, each may be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, without limitation. An operating system, one or more application programs, other program modules, and program data may also be stored in system memory 28 by way of example, without limitation. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication may occur via input/output (I/O) interfaces 22. Still yet, computer system/server 12 may communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to, microcode, device drivers, redundant processing units, external disk drive arrays, RAID systems, tape drives, and data archival storage systems, etc.

Figure 2:
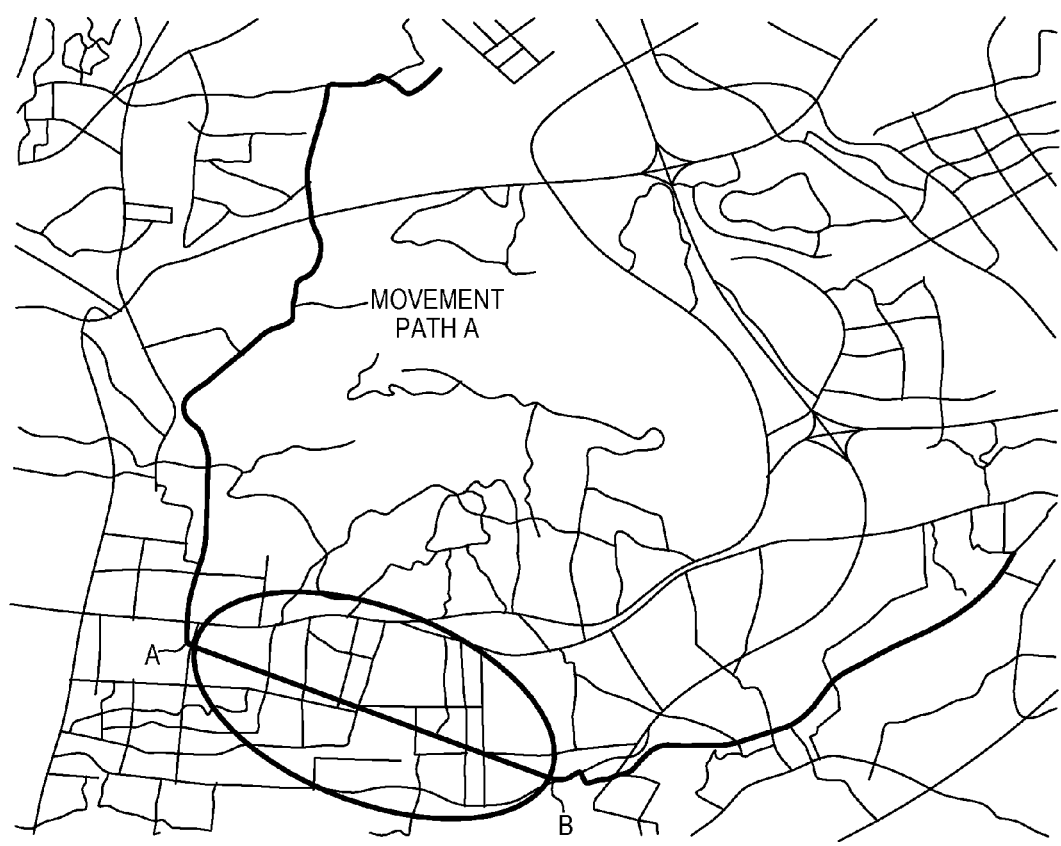
FIG. 2 is an example of a movement path having a missing part.

A method and an apparatus for building a missing part of a movement path of an object according to embodiments of the present disclosure will now be described with reference to the accompanying drawings. The object may be a person, a vehicle or any other article that can be controlled by a person. Hereinafter, the embodiments of the present disclosure will be described by taking a person as an example of the object for convenience of description. Further, as described above, the missing part of the movement path of the object can be caused due to various reasons. FIG. 2 shows an example of the movement path having the missing part, where on the movement path a, a part between point A and point B (a part indicated by an ellipse) is missing. This missing part can be built by using the method and the apparatus according to the embodiments of the present disclosure.

Embodiments of the present recognize that, when people travel from a departure point to a destination, even if there are a plurality of routes between the departure point and the destination, they still tend to travel along their habitual route. Therefore, it is possible to estimate the missing part of the movement path of the people on the basis of their historical movement path, thereby building the missing part.

Operations for building a missing part of a movement path of an object according to the embodiment of the present disclosure will now be described with reference to FIG. 3.

Figure 3:
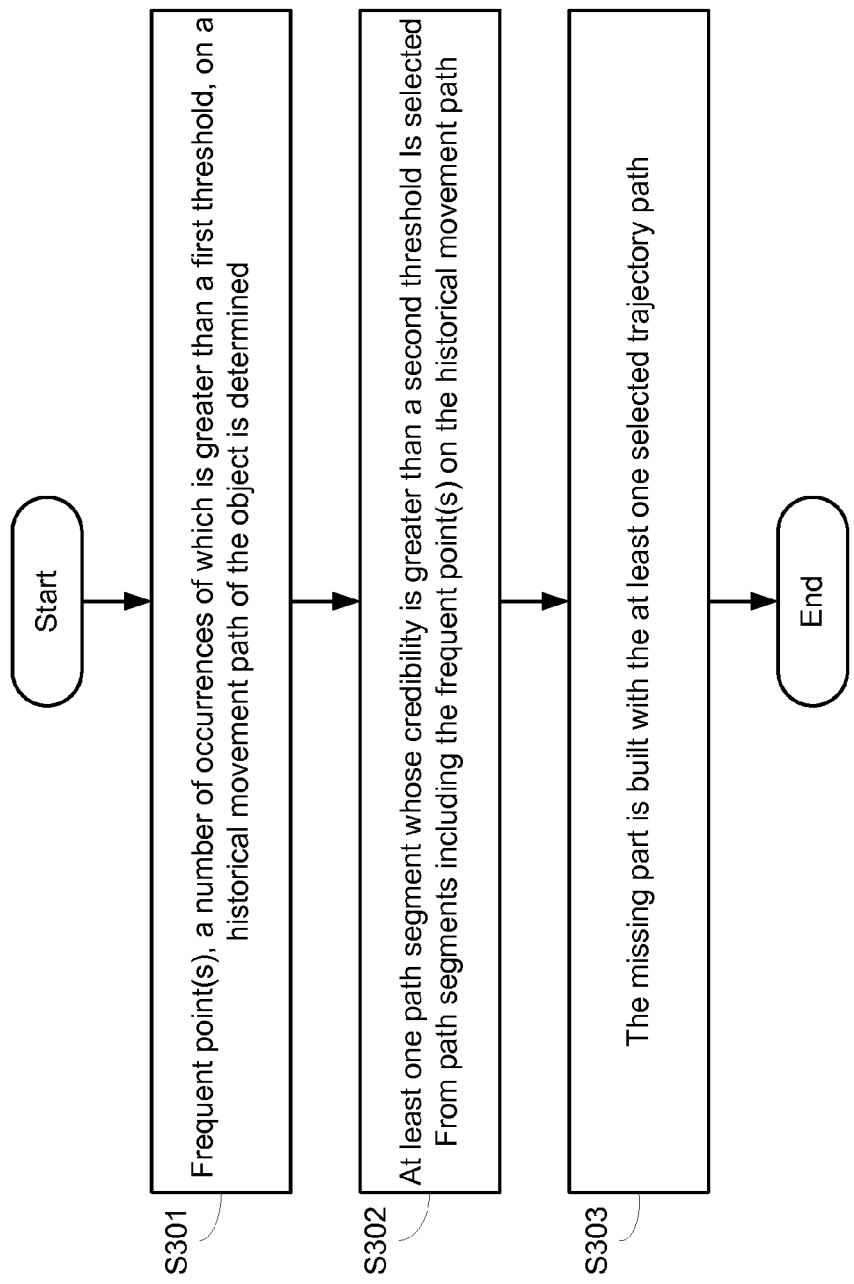
FIG. 3 is a flowchart depicting operations for building a missing part of a movement path of an object, in accordance with an embodiment of the present disclosure.

As depicted in FIG. 3, in step S301, a point (hereinafter referred to as frequent point(s) for the convenience of description), a number of occurrences greater than a first threshold, on respective historical movement trajectories of the object is determined.

Specifically, in a past period of time (e.g., one year) and in a predetermined geographic region (e.g., a city), the object may move between different points (i.e., sites), so that one or more movement trajectories (i.e., the historical movement trajectories) of the object are generated in the geographic region. Each historical movement path is formed by connecting the points which the object passes through when it moves. The points through which the respective historical movement trajectories pass (including a starting point, a terminal point and/or an intermediate point) may be the same or may be different. Further, the object may frequently pass through some points in the geographic region, such that the points occur on one or more historical movement trajectories multiple times. In an embodiment of the present disclosure, a point, a number of occurrences greater than a first threshold, may be determined as a point which the object passes through frequently (i.e., frequent point(s)). The first threshold may be set flexibly as actually needed, and for example, it may be set to two. Because the frequent point(s) are often located on a movement path along which the object frequently travels, the movement path along which the object frequently travels may be found by finding the frequent point(s) on the historical movement trajectories of the object. In an embodiment of the present disclosure, data of the historical movement trajectories may be stored in, for example, a historical movement path database.

To find the frequent point(s), the number of occurrences for which respective points on the respective historical movement trajectories of the object occur on these historical movement trajectories can be determined. The number of occurrences are compared with the first threshold. If the number of occurrences of a certain point is greater than the first threshold, this point may be determined as the frequent point(s). Otherwise, this point is not determined as the frequent point(s).

Specifically, for each historical movement path, a path sequence Tr representing the historical movement path may be generated. The path sequence Tr may contain a plurality of elements, each of which corresponds to a point on the historical movement path. For example, for a historical movement path which passes through m points, its path sequence can be expressed as $Tr=\{E_1, E_2, \ldots, E_m\}$ or $Tr=E_1E_2 \ldots E_m$, where $Ei(1 \leq i \leq m)$ denotes an $i^{th}$ element of the path sequence Tr. Tr can be further expressed as (Loc(i), Time(i)), where Loc(i) represents a location of a point which corresponds to the element $E_i$ on the historical movement path, and Time(i) represents time at which the object passes through the point corresponding to the element $E_i$ when the object travels along the historical movement path. It is to be appreciated that in other embodiments of the present disclosure, the $i^{th}$ element may only include Loc(i), and does not include Time(i).

Figure 4:
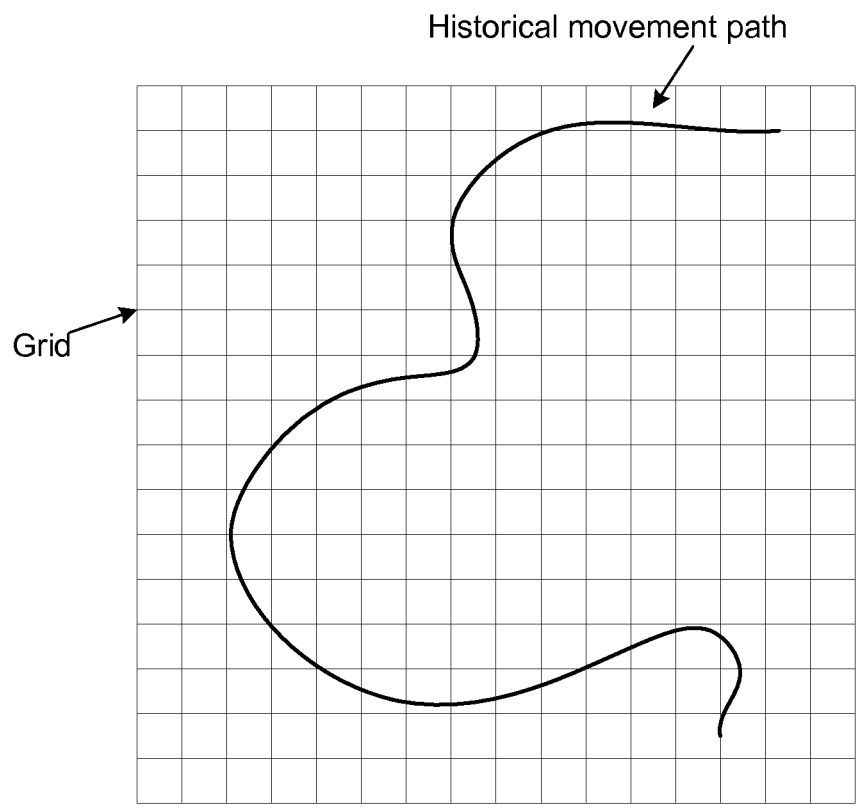
FIG. 4 is a schematic diagram of generating a path sequence representing a movement path by using a Grid-cell technique.

The path sequence representing the historical movement path can be generated by a variety of methods. For example, the path sequence may be generated by a Grid-cell technique. In this technique, the geographic region (such as a city) where the historical movement path is located may be rasterized, as shown in FIG. 4. The locations of the respective points may be determined according to locations of grids where the respective points on the historical movement path are located (i.e., the locations of the respective points are represented by the locations of the grids where the respective points are located) so as to determine Loc values of the respective elements in the path sequence of the historical movement path. Further, when the historical movement path is recorded, the time when the object passes through the respective points on the historical movement path can be recorded simultaneously, so that Time value of the respective elements in the path sequence of the historical movement path can be determined. In this way, the respective elements in the path sequence can be determined. It is to be noted that, in the Grid-cell technique, sizes of the respective grids formed by rasterizing the region where the historical movement path is located may be the same or different, and shapes of the respective grids are not limited to rectangular shapes shown in FIG. 4, and can be any shapes selected as actually needed, such as diamond shapes.

In addition to the Grid-cell technique, a POI sequence technique may also be used to generate the path sequence representing each historical movement path. In this method, the respective elements in the path sequence is caused to correspond to respective POIs through which the historical movement path passes, the Loc value of each element is set as a POI name corresponding to the element (e.g., a name of a building in a case where the POI is the building), and the Time value of each element is set as time when the object passes through the POI corresponding to the element, thereby the respective elements in the path sequence can be determined. Of course, in addition to the above methods, other methods (e.g., a road segmentation method, etc.) may be used to generate the path sequence representing the historical movement path. Additionally, a path sequence representing a movement path of the object (which may be referred to as a path sequence hereinafter) can be generated by using similar methods, where an element in the path sequence represents a corresponding point on the movement path.

After the path sequences representing the respective historical movement trajectories have been generated, the number of times at which each element in the respective path sequences occurs in all the path sequences can be determined. Then, the number of occurrences of each element can be compared with the first threshold. If the number of occurrences of a certain element is greater than the first threshold, the element can be determined as a frequent element and the point corresponding to the element on the historical movement path can be determined as frequent point(s). As an example, it is assumed that there are three historical movement trajectories, their path sequences may be expressed as Tr1=ABCDF, Tr2=DAC and Tr3=CDAE respectively, and the first threshold is set to 2, then it may be determined that elements A, C and D in the three path sequences are frequent elements and their corresponding points on the historical movement trajectories are frequent points.

Returning to FIG. 3, in step S302, at least one path segment whose credibility is greater than a second threshold is selected from path segments including the frequent point(s) on the respective historical movement trajectories, where the credibility represents a possibility that the path segment is the same as the missing part of the movement path of the object. The greater the credibility is, the greater the possibility that the path segment is the same as the missing part of the movement path of the object is. The second threshold may be a value selected as actually needed. A purpose for this operation is to identify the path segment, which is most likely to be the same as the missing part of the movement path, on the historical movement path, in order to subsequently build the missing part by using the identified path segment.

In an embodiment of the present disclosure, a path segment including the frequent point(s) may be a segment having the frequent point(s) as a starting point thereof. Hereinafter, operations of step S302 in this implementation will be described in detail with reference to FIG. 5.

Figure 5:
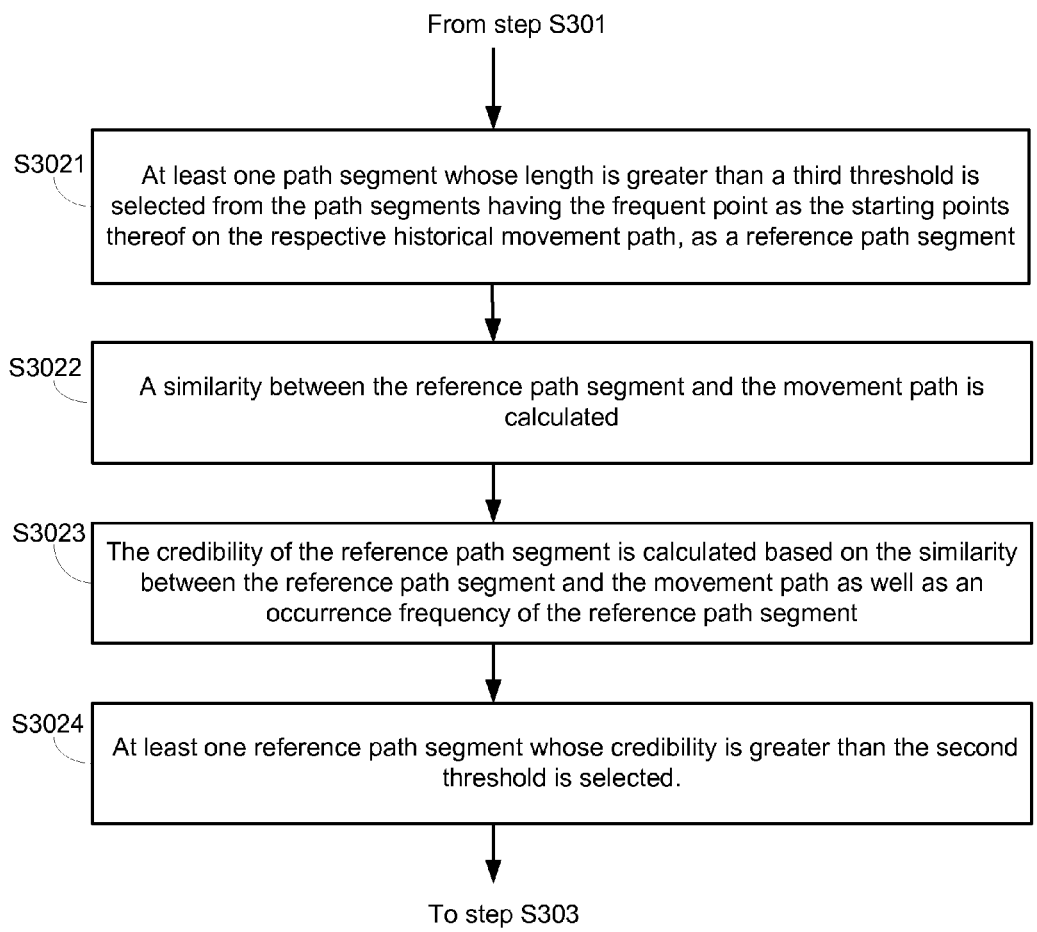
FIG. 5 is a flowchart depicting details of step S302 of FIG. 3, in accordance with an embodiment of the present disclosure.

As shown in FIG. 5, in step S3021, at least one path segment whose length (e.g., number of points through which it passes) is greater than a third threshold is selected from the path segments having the frequent point(s) as the starting points thereof on the respective historical movement trajectories, as a reference path segment. The at least one reference path segment will be used for subsequent operations. The third threshold may be a value selected as actually needed, and for example, the third threshold may be set to 2. Specifically, in a case where the respective historical movement trajectories are represented as the path sequences, at least one subsequence whose length (e.g., number of elements) is greater than the third threshold is selected from subsequences starting with the frequent element corresponding to the frequent point(s) respectively in the respective path sequences, as a reference subsequence corresponding to the reference path segment having the frequent point(s) as the starting point thereof, thereby determining the reference path segment. For example, in the above example of the three historical movement trajectories, it is assumed that the third threshold is 2, and because the frequent elements are A, C and D (it is assumed that the corresponding frequent points are A', B' and C'), in the path sequences representing the three historical movement trajectories, subsequences starting with the element A are ABCDF, AC and AE, subsequences starting with the element C are CDF, C and CDAE, and subsequences starting with the element D are DF, DAC and DAE. From these subsequences, the subsequences ABCDF, CDF, CDAE, DAC, and DAE whose lengths (i.e., numbers of elements) are greater than 2 can be selected, as the reference subsequences respectively corresponding to the path segments having the frequent point(s)s A', B' and C' as the starting points thereof respectively. In an embodiment of the present disclosure, data of the selected reference path segment or reference subsequence can be stored in a reference database.

It can be seen that through the above steps S301 and S3021, only the path segment having the frequent point(s) as the starting point thereof and having a length greater than a predetermined length may be extracted from the plurality of historical movement trajectories for subsequence analysis operations, thereby reducing an amount of data to be analyzed in the subsequent analysis operations and improving efficiency of building the missing part. When there are many historical movement trajectories or many reference subsequences extracted in step S3021, the first threshold and the third threshold may be appropriately adjusted, and step S301 and step S3021 may be executed again based on the adjusted first threshold and the adjusted third threshold, in order to further reduce the number of the reference subsequences extracted in step S3021. The above operations of adjusting the first threshold and the third threshold and executing step S301 and step S3021 again may be executed repeatedly, until the number of the reference subsequences extracted in step S3021 is smaller than a preset threshold, or until a preset number of times of the repeated execution is reached.

Referring further to FIG. 5, in step S3022, a similarity between the reference path segment and the movement path is calculated.

In the embodiment of the present disclosure, the movement path may be divided into a plurality of segments, where at least one of the segments includes the missing part to be built, then a similarity between the reference path segment and the path segment including the missing part (which may be referred to as a missing path segment hereinafter for convenience of description) of the movement path may be calculated, as the similarity between the reference path segment and the movement path.

Specifically, a longest common subsequence (LCS) between a reference subsequence corresponding to each reference path segment and a subsequence corresponding to the missing path segment (which may be referred to a missing subsequence hereinafter) in the path sequence representing the movement path may be first identified. The LCS can be found by a variety of methods. For example, an LCS algorithm for identifying a LCS between two sequences which is known in the art may be used to find the LCS between the reference subsequence and the missing subsequence. Alternatively, two elements nearest to elements at two ends of the missing subsequence may be found from elements of the reference subsequence, and a subsequence between the two elements found from the reference subsequences is taken as the LCS. For example, it is assumed that the reference subsequence is ABCDF, the missing subsequence is GHJ, and two elements nearest to the elements G and J at two ends of the missing subsequence in the elements A, B, C, D and F are respectively A and C, the LCS between the reference subsequence ABCDF and the missing subsequence GHJ is ABC.

The similarity between the reference subsequence and the missing subsequence can be calculated based on a length of the LCS between the reference subsequence and the missing subsequence, a length of the reference subsequence and a length of the missing subsequence, as the similarity between the reference path segment and the movement path. The larger the length of the LCS is and the smaller the respective lengths of the reference subsequence and the missing subsequence are, the greater proportions of the LCS to the reference subsequence and the missing subsequence are, and thus the greater the similarity between the reference subsequence and the missing subsequence is. Based on this finding, the similarity (sim) between each reference subsequence and the missing subsequence can be calculated by, for example, formula (1) below:

$$sim = \frac{lcslength}{\sqrt{mlength \times rlength}} \quad (1)$$

where lcslength is the length of the LCS, mlength is the length of the missing subsequence, and rlength is the length of the reference subsequence. In the example described above, since the reference subsequence is ABCDF, the missing subsequence is GHJ, and the LCS is ABC, lcslength is 3, mlength is 3, rlength is 5, then the similarity (sim) between the reference subsequence and the missing subsequence is $$\frac{3}{\sqrt{3 \times 5}}.$$

It is to be appreciated that the above formula (1) is merely illustrative rather than limitative, and the similarity (sim) can also be calculated by another formula, e.g., formula (2) below:

$$sim = \frac{lcslength}{mlength + rlength} \quad (2)$$

Next, in step S3023, credibility of the reference path segment is calculated based on the similarity between the reference path segment and the movement path as well as an occurrence frequency of the reference path segment.

Specifically, the credibility of the reference path segment may be calculated so that the greater the similarity between the reference path segment and the movement path is, the greater the credibility of the reference path segment is. Or, the credibility of the reference path segment may be calculated so that the greater the occurrence frequency of each reference path segment is, the greater the credibility of each reference path segment is. This is because the greater the similarity between the reference path segment and the movement path is, the greater the possibility that the missing part of the movement path is the same as a corresponding part of the reference path segment is. However, for two reference path segments with the same similarity, if the occurrence frequency of one path segment is higher than that of the other path segment, this shows that the object is more likely to travel along the one reference path segment, and accordingly, there is a greater possibility that the reference path segment is the same as the missing part of the movement path. On this basis, the credibility (Cre) of each reference path segment can be calculated by, for example, formula (3) below:

$$Cre = rfrequency \times sim \qquad (3)$$

where rfrequency indicates the occurrence frequency of the reference path segment in a past period of time, and sim is the similarity between the reference path segment and the missing path segment (i.e., the similarity between the reference subsequence corresponding to the reference path segment and the missing subsequence). Of course, in addition to the above formula (3), other formula, e.g., the following formula (4), may also be used to calculate the credibility:

$$Cre = rfrequency + sim \qquad (4).$$

Then, in step S3024, at least one reference path segment whose credibility is greater than the second threshold is selected, as the at least one path segment to be used for building the missing part in a subsequent step S303. Alternatively, a predetermined number of reference path segments may be selected in a descending order of the credibility thereof, as the at least one path segment to be used for building the missing part in the subsequent step S303.

In another embodiment of the present disclosure, the path segment including the frequent point(s) may be a segment having the frequent point(s) as a terminal point thereof, and in this case, simply replace the "starting point" in the description of the above embodiments with the "terminal point", and simply replace the "start/starting with . . . " in the description of the above embodiments with "end/ending with . . . ". In other words, the path segment including the frequent point(s) as described in the present description may be a segment having the frequent point(s) as an end point.

In still another embodiment of the present disclosure, the path segment including the frequent point(s) on the historical movement path is a path segment in which a distance between an end point thereof and the frequent point(s) is less than a predetermined value. In other words, the path segment including the frequent point(s) may also be a segment which includes the path segment having the point as an end point thereof on the historical movement path and is longer than the path segment having the point as the end point thereof by a predetermined value. The predetermined value may be a value set as actually needed. For example, the predetermined value may be set such that the path segment including the frequent point(s) may also be a path segment which includes the path segment having the point as the end point thereof on the historical movement path and is slightly longer than the path segment having the point as the end point thereof. In this embodiment, in the manner similar to that described above with regard to FIG. 5, at least one path segment whose length is greater than a third threshold may be selected from the path segments including the frequent point(s) on the historical movement path, as the reference path segment, the similarity between the reference path segment and the movement path may be calculated, and the credibility of the reference path segment may be calculated based on the similarity between the reference path segment and the movement path as well as the occurrence frequency of the reference path segment, then at least one path segment whose credibility is greater than the second threshold may be selected from the at least one reference path segment, as at least one path segment to be used for building the missing part in the subsequent step S303.

Returning to FIG. 3, in step S303, the missing part of the movement path can be built by using the at least one selected path segment (i.e., the reference path segment described above). Specifically, one of the at least one selected path segment (e.g., a path segment with a highest credibility) may be used as the missing part of the movement path, thereby building the missing part. In the example described above, it is assumed that in the at least one selected path segment, the reference path segment corresponding to the reference subsequence ABCDF has the highest credibility, then the reference path segment can be used as the missing part of the movement path, i.e., the missing subsequence GHJ in the path sequence may be replaced with the reference subsequence ABCDF, thereby building the missing part. Alternatively, a combination of the at least one selected path segment (e.g., formed in a weighted-average manner) may be used as the missing part of the movement path, thereby building the missing part. For example, in case where the missing part is built by using a combination of two selected path segments, average values of location coordinates of respective points on the two path segments may be calculated to obtain a combined path segment formed by points having the calculated average location coordinates, then combined path segment may be used as the missing part of the movement path. Of course, in addition to the above method, the missing part may be built by other methods.

Thus, with the above method according to the embodiment of the present disclosure, the path segment with a high possibility of being the same as the missing part of the movement path of the object may be extracted from the historical movement path of the object, and then the missing part of the movement path may be built by using the extracted path segment. As this method does not rely on a specific map or a road network, and takes the habit of the object into account to build the missing part according to the path along which the object frequently travels, it has a relatively high accuracy.

Various embodiments for implementing the method of the present disclosure have been described above with reference to the accompanying drawings. Those skilled in the art may understand that the above method may be implemented in software, in hardware, or in a combination thereof. Furthermore, those skilled in the art may understand that by implementing the respective steps of the method in software, in hardware, or in a combination thereof, an apparatus for building a missing part of a movement trajectory of an object based on the same inventive concept can be provided. Even if a hardware configuration of the apparatus is the same as that of a general-purpose processing apparatus, the apparatus will exhibit characteristics different from the general-purpose processing apparatus due to a function of software contained therein, so as to form the apparatus according to the embodiment of the present disclosure. The apparatus of the present disclosure comprises a plurality of units or modules, which are configured to execute corresponding steps. Those skilled in the art may understand how to write a program to implement actions of the units or modules by reading the present specification.

The apparatus for building a missing part of a movement path of an object according to the embodiment of the present disclosure will be described in detail below with reference to FIG. 6. Because the apparatus and the method are based on the same inventive concept, the same or corresponding implementation details in the above method are also applicable to the apparatus corresponding to the above method, and these implementation details will not be described below because they have been described in the above in detail.

Figure 6:
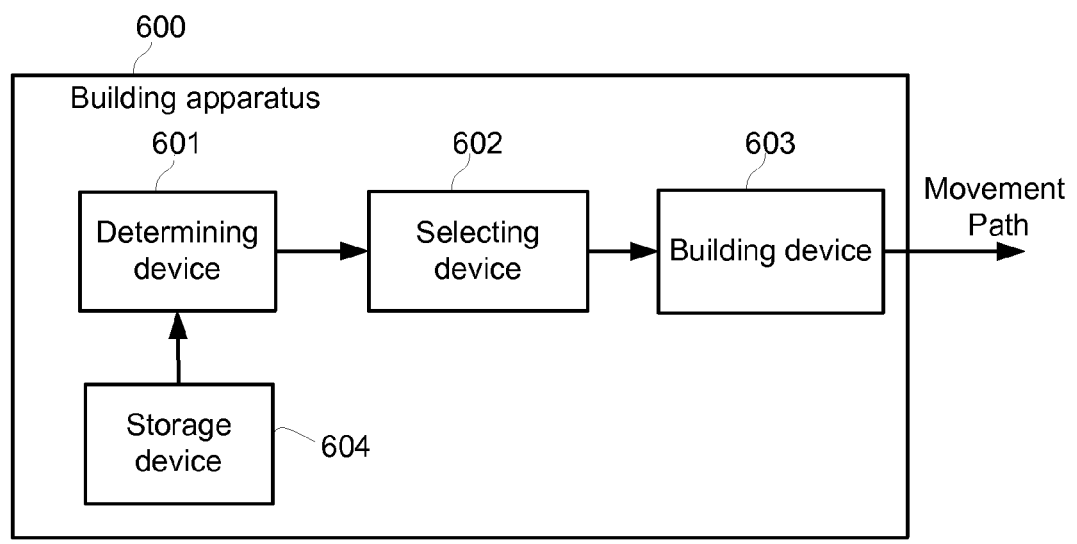
FIG. 6 is a block diagram of an apparatus for building a missing part of a movement path of an object, in accordance with an embodiment of the present disclosure.

As shown in FIG. 6, the building apparatus 600 for building the missing part of the movement path of the object (hereinafter referred to as building apparatus) according to the embodiment of the present disclosure may comprise a determining device 601, a selecting device 602 and a building device 603. Optionally, the building apparatus 600 may further comprise a storage device 604 for storing the database described above.

Figure 7:
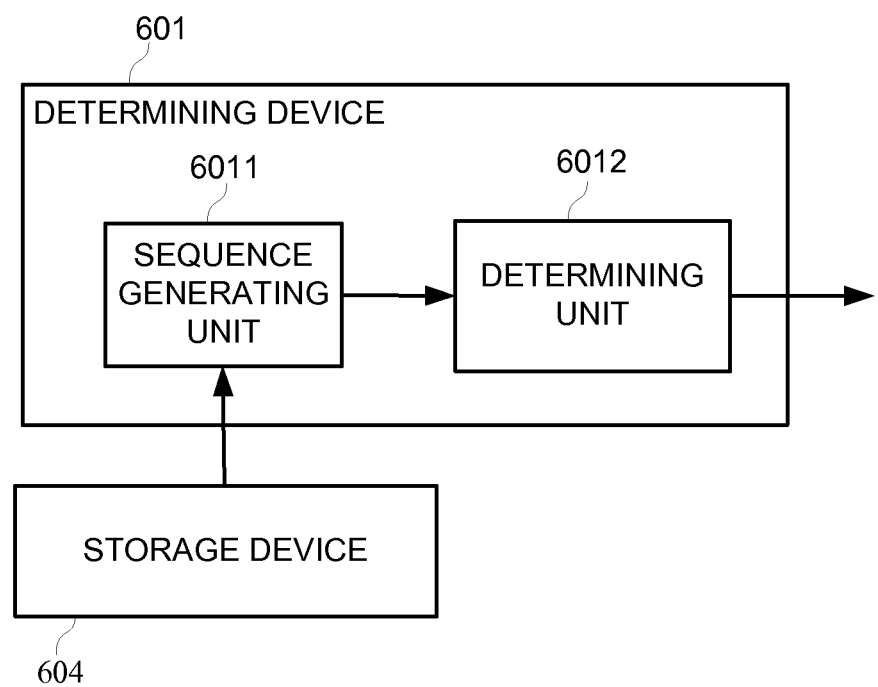
FIG. 7 is a block diagram of a determining device, as shown in FIG. 6, in accordance with an embodiment of the present disclosure.

The determining device 601 may determine a point, a number of occurrences that is greater than the first threshold, on respective historical movement paths of the object. Specifically, as shown in FIG. 7, the determining device 601 may include a sequence generating unit 6011 and a determining unit 6012. The sequence generating unit 6011 may generate a path sequence representing each historical movement path. The path sequence may include a plurality of elements, where each element corresponds to a point on the historical movement path. The path sequence may include a location of the point corresponding to the element on the historical movement path (i.e., the above-described Loc). And, the path sequence may further include time at which the object passes through the point corresponding to the element when the object travels along the historical movement path (i.e., the above-described Time). The sequence generating unit 6011 may generate the path sequence representing the historical movement path by using various methods described above. In addition, the sequence generating unit 6011 may generate a path sequence representing the movement path of the object, i.e., a path sequence, in a similar manner, where an element in the path sequence represents a corresponding point on the movement path. The determining unit 6012 may determine the number of times at which each element in the respective path sequences generated by the generating unit 6011 occurs in all the path sequences, then compare the number of occurrences of each element with the first threshold, determine an element, the number of times of occurrence of which is greater than the first threshold, as a frequent element, and determine a point corresponding to the element on the historical movement path as frequent point(s).

Returning to FIG. 6, the selecting device 602 may select at least one path segment whose credibility is greater than the second threshold from path segments including the frequent point(s) on the respective historical movement trajectories, where the credibility represents a possibility that the path segment is the same as the missing part of the movement path of the object. The greater the credibility is, the greater the possibility that the path segment is the same as the missing part of the movement path of the object is. The second threshold may be a value selected as actually needed. As described above, in the embodiment of the present disclosure, a path segment including the frequent point(s) on the historical movement path may be at least one of a path segments having the point as a starting point thereof on the historical movement path; a path segment having the point as a terminal point on the historical movement path; and a path segment where a distance between an end point thereof and the frequent point(s) is less than a predetermined value, in other words, a path segment which includes the path segment having the point as an end point thereof on the historical movement path and is longer than the path segment having the point as the end point thereof by a predetermined value. Hereinafter, for simplicity, a description is made by taking an example that the path segment including the frequent point(s) is the path segment having the point as the starting point thereof, and this description may be applied to the other two cases after necessary adjustments.

Figure 8:
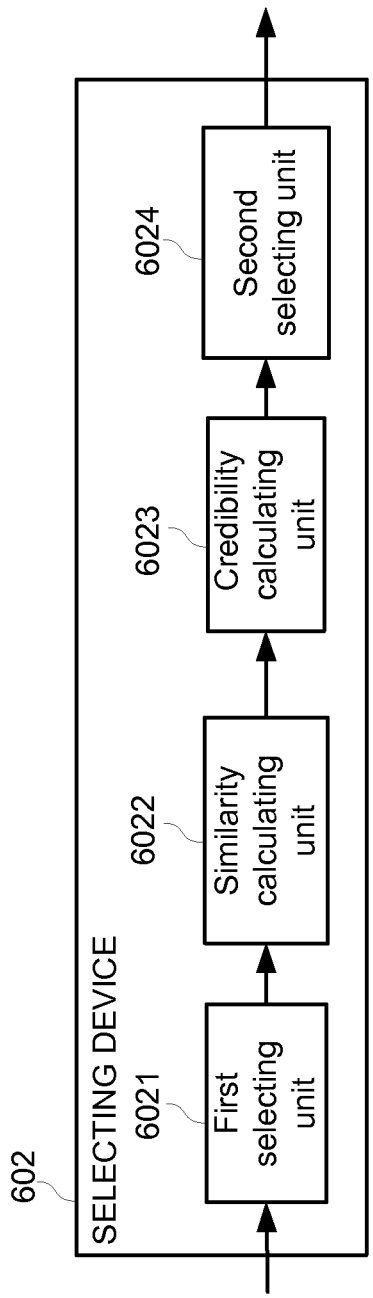
FIG. 8 is a block diagram of a selecting device, as shown in FIG. 6, in accordance with an embodiment of the present disclosure.

Specifically, as shown in FIG. 8, the selecting device 602 may include a first selecting unit 6021, a similarity calculating unit 6022, a credibility calculating unit 6023 and a second selecting unit 6024.

The first selecting unit 6021 may select at least one path segment whose length is greater than a third threshold from path segments having the frequent point(s) as the start points thereof on the respective historical movement trajectories, as a reference path segment. The at least one reference path segment will be used for subsequent operations. The third threshold may be a value selected as actually needed. Specifically, in a case where the respective historical movement trajectories are represented as path sequences, the first selecting unit 6021 may select at least one subsequence whose length is greater than the third threshold from subsequences starting with the frequent element corresponding to the frequent point(s) in the respective path sequences, as a reference subsequence corresponding to the reference path segment, thereby determining the reference path segment.

The similarity calculating unit 6022 may calculate a similarity between the reference path segment and the movement path. Specifically, in the embodiment of the present disclosure, the similarity calculating unit 6022 may divide the movement path into a plurality of segments, where at least one segment includes the missing part to be built, and then calculate a similarity between the reference path segment and the path segment including the missing part of the movement path (i.e., the missing path segment described above), as the similarity between the reference path segment and movement path. Specifically, the similarity calculating unit 6022 may firstly identify an LCS between a reference subsequence corresponding to each reference path segment and a subsequence corresponding to the missing path segment in the path sequence representing the movement path (i.e., the missing subsequence described above). Then, the similarity calculating unit 6022 may calculate the similarity between each reference subsequence and the missing subsequence based on a length of the LCS between the reference subsequence and the missing subsequence, a length of the reference subsequence and a length of the missing subsequence, as the similarity between the each reference path segment and the movement path.

The credibility calculating unit 6023 may calculate a credibility of the reference path segment based on the similarity between the reference path segment and the movement path as well as an occurrence frequency of the reference path segment. Specifically, the credibility calculating unit 6023 may calculate the credibility of the reference path segment, so that the greater the similarity between the reference path segment and the movement path is, the greater the credibility of the reference path segment is, or so that the greater the occurrence frequency of the reference path segment is, the greater the credibility of the reference path segment is.

The second selecting unit 6024 may select at least one reference path segment whose credibility is greater than a second threshold, as the at least one path segment to be used for building the missing part in subsequent building operation. Alternatively, the second selecting unit 6024 may select a predetermined number of reference path segments in a descending order of credibility thereof, as the at least one path segment to be used for building the missing part in the subsequent building operation.

Returning to FIG. 6, the building device 603 may build the missing part of the movement path by using the at least one selected path segment (i.e., the reference path segment described above). As described above, the building device 603 may use one of the at least one selected path segment as the missing part of the movement path, thereby building the missing part. Alternatively, it may use a combination of the at least one selected path segment as the missing part of the movement path.

Thus, with the above building apparatus according to the embodiment of the present disclosure, a path segment with a high possibility of being the same as the movement path of the object can be extracted from the historical movement path of the object, then the missing part of the movement path may be built by the extracted path segment. Such a building apparatus does not rely on a map and a road network in the region where the object is located, and have a relatively high accuracy.

It is to be appreciated that the method and the apparatus according to the above embodiments of the present disclosure are only illustrative, rather than limitative, and those skilled in the art can make various modifications thereto without departing from the scope of the present disclosure. For example, although it is described above that the missing part of the movement path of the object is built by using the historical path of the object, this is not limitative. In other embodiments, the object may include a plurality of subjects, and in order to build a missing part of a movement path of a subject, a historical movement path of another subject can be used as long as a historical movement path of the subject can be determined based on the historical movement path of the other subject. In addition, when the credibility is calculated, time corresponding to each path, besides the similarity and the occurrence frequency, may be considered. Specifically, when traveling from the departure point to the destination, people may follow different trajectories in different time (e.g., at day and at night), and accordingly, a time-related coefficient may be added to the credibility calculated according to the above formula (3), so that a credibility of a reference path segment in a time period which is the same as that of the movement path is higher than a credibility of a reference path segment in a time period which is different from that of the movement path. In addition, although step S302 of the method according to the embodiment of the present disclosure described above with reference to FIG. 5 includes steps S3021-S3024, this is not limitative. Step S3021 can be omitted, and the similarity between the path segment having the frequent point(s) as the starting point thereof and the movement path may be calculated in step S3022; optionally, step S3023 can also be modified, so that in this step the similarity calculated in step S3022 is directly used as the credibility. The above variations are also applicable to the selecting device 602 in the building apparatus 600 according to the embodiment of the present disclosure.

The present disclosure may be a system, a method, and/or a computer program product. The computer program product may include a computer readable storage medium (or media) having computer readable program instructions thereon for causing a processor to carry out aspects of the present disclosure.

The computer readable storage medium may be a tangible device that may retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein may be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, may be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that may direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or part of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts, or combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for finding a movement path, the method comprising:
    generating, by one or more processors, a recently completed movement path of a computing device with a missing portion;
    determining, by one or more processors, one or more frequent points within the missing portion, wherein each of the one or more frequent points is a point on a historical movement path of the computing device having a number of occurrences greater than a first threshold;
    determining, by one or more processors, a credibility of one or more path segments, wherein each of the one or more path segments includes at least one frequent point;
    selecting, by one or more processors, a first path segment of the one or more path segments, wherein the credibility of the first path segment is greater than a second threshold; and
    inserting, by one or more processors, the first path segment as the missing portion of the movement path of the computing device.

2. The method of claim 1, wherein determining the one or more frequent points further comprises:
    generating, by one or more processors, a path sequence, wherein the path sequence corresponds to a historical movement path; and
    determining, by one or more processors, a first frequent point of the one or more frequent points based, at least in part, on an element of the path sequence, wherein the element has a number of occurrences greater than the first threshold.

3. The method of claim 2, wherein the element of the path sequence includes one or more points of the historical movement path, and wherein each point of the historical movement path is included in one or more elements of the historical movement path.

4. The method of claim 3, wherein an element of the path sequence includes at least one point of the historical movement path through which the computing device passes.

5. The method of claim 1, wherein a first frequent point of the one or more frequent points is an end point of the historical movement path.

6. The method of claim 5, further comprising:
    determining, by one or more processors, that a distance between an end point of the first path segment and a second frequent point of the first path segment is less than a predetermined value.

7. The method of claim 6, further comprising:
    determining, by one or more processors, that the credibility of the selected first path segment is greater than the second threshold;
    selecting, by one or more processors, the first path segment, wherein the first path segment has a length greater than a third threshold, and wherein the first path segment comprises the one or more frequent points on the historical movement path;
    calculating, by one or more processors, a similarity between a reference path segment and the movement path;

calculating, by one or more processors, a credibility of the reference path segment based on the similarity and an occurrence frequency of the reference path segment; and identifying, by one or more processors, the reference path segment as the first path segment in response to determining that the credibility of the reference path segment is greater than the second threshold.

8. The method of claim 7, wherein the credibility of the reference path segment is positively correlated with the similarity between the reference path segment and the movement path.

9. The method of claim 7, wherein the occurrence frequency of the reference path segment is positively correlated with the credibility of the reference path segment.

10. The method of claim 1, wherein building the missing portion uses at least the first reference path segment.

11. A computer program product for finding a movement path, the computer program product comprising:

a computer readable storage medium and program instructions stored on the computer readable storage medium, the program instructions comprising:

program instructions to generate a recently completed movement path of a computing device with a missing portion;

program instructions to determine one or more frequent points within the missing portion, wherein the one or more frequent points are a point on a historical movement path of a computing device having a greater number of occurrences than a first threshold;

program instructions to determine a credibility of one or more path segments, wherein each of the one or more path segments includes at least one frequent point;

program instructions to select a first path segment of the one or more path segments, wherein the credibility of the one or more path segments is greater than a second threshold; and program instructions to insert the first path segment as the missing portion of the movement path of the computing device.

12. The computer program product of claim 11, wherein program instructions to determine the one or more frequent points further comprises:

program instructions to generate a path sequence, wherein the path sequence corresponds to a historical movement path; and program instructions to determine a first frequent point of the one or more frequent points based, at least in part, on an element of the path sequence, wherein the element has a number of occurrences greater than the first threshold.

13. The computer program product of claim 11, further comprising:

program instructions to determine that a distance between an end point of the first path segment and a second frequent point of the first path segment is less than a predetermined value, wherein a first frequent point of the one or more frequent points is an end point of the historical movement path.

14. The computer program product of claim 13, further comprising:

program instructions to determine that the credibility of the selected first path segment is greater than the second threshold;

program instructions to select the first path segment, wherein the first path segment has a length greater than a third threshold, and wherein the first path segment comprises the one or more frequent points on the historical movement path;

program instructions to calculate a similarity between a reference path segment and the movement path;

program instructions to calculate a credibility of the reference path segment based on the similarity and an occurrence frequency of the reference path segment; and program instructions to identify the reference path segment as the first path segment in response to determining that the credibility of the reference path segment is greater than the second threshold.

15. The computer program product of claim 13, wherein the credibility of the reference path segment is positively correlated with the similarity between the reference path segment and the movement path, and wherein the occurrence frequency of the reference path segment is positively correlated with the credibility of the reference path segment.

16. A computer system for finding a movement path, the computer system comprising:

one or more computer processors;

one or more computer readable storage media;

program instructions stored on the computer readable storage media for execution by at least one of the one or more processors, the program instructions comprising:

program instructions to generate a recently completed movement path of a computing device with a missing portion;

program instructions to determine one or more frequent points within the missing portion, wherein the one or more frequent points are a point on a historical movement path of a computing device having a greater number of occurrences than a first threshold;

program instructions to determine a credibility of one or more path segments, wherein each of the one or more path segments includes at least one frequent point;

program instructions to select a first path segment of the one or more path segments, wherein the credibility of the first path segment is greater than a second threshold; and program instructions to insert the first path segment as the missing portion of the movement path of the computing device.

17. The computer system of claim 16, wherein program instructions to determine the one or more frequent points further comprises:

program instructions to generate a path sequence, wherein the path sequence corresponds to a historical movement path; and program instructions to determine a first frequent point of the one or more frequent points based, at least in part, on an element of the path sequence, wherein the element has a number of occurrences greater than the first threshold.

18. The computer system of claim 16, program instructions to determine that a distance between an end point of the first path segment and a second frequent point of the first path segment is less than a predetermined value, wherein a first frequent point of the one or more frequent points is an end point of the historical movement path.

19. The computer system of claim 18, further comprising:

program instructions to determine that the credibility of the selected first path segment is greater than the second threshold;

program instructions to select the first path segment, wherein the first path segment has a length greater than a third threshold, and wherein the first path segment comprises the one or more frequent points on the historical movement path;

program instructions to calculate a similarity between a reference path segment and the movement path;

program instructions to calculate a credibility of the reference path segment based on the similarity and an occurrence frequency of the reference path segment; and program instructions to identify the reference path segment as the first path segment in response to determining that the credibility of the reference path segment is greater than the second threshold.

20. The computer system of claim 18, wherein the credibility of the reference path segment is positively correlated with the similarity between the reference path segment and the movement path, and wherein the occurrence frequency of the reference path segment is positively correlated with the credibility of the reference path segment.

* * * * *